United States Patent
Koike et al.

(10) Patent No.: US 7,080,042 B2
(45) Date of Patent: Jul. 18, 2006

(54) METHOD OF AND A SYSTEM FOR DISTRIBUTING DIGITAL CONTENTS

(75) Inventors: Hiroshi Koike, Maebashi (JP); Nobuya Okayama, Kawasaki (JP); Masayuki Orimo, Kawasaki (JP); Shigeru Matsuzawa, Machida (JP); Miyoko Namioka, Kawasaki (JP); Kumiko Igawa, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/473,277

(22) Filed: Dec. 28, 1999

(65) Prior Publication Data

US 2003/0182231 A1    Sep. 25, 2003

(30) Foreign Application Priority Data

Dec. 28, 1998   (JP)   ................................. 10-373651

(51) Int. Cl.
*G06F 17/60*   (2006.01)

(52) U.S. Cl. .............................. 705/52; 705/1; 705/51; 705/53; 705/64; 725/1; 725/4; 725/5; 725/8; 725/62; 725/63; 725/97; 725/135; 725/143; 380/200; 380/201; 380/202; 380/203

(58) Field of Classification Search .................. 705/26, 705/50–80, 1, 25; 725/1–8, 62–153, 38; 380/200–203; 709/228
See application file for complete search history.

(56) References Cited

U.S. PATENT DOCUMENTS

| | | | |
|---|---|---|---|
| 4,674,055 A | | 6/1987 | Ogaki et al. |
| 5,418,713 A | | 5/1995 | Allen |
| 5,600,573 A | * | 2/1997 | Hendricks et al. .......... 725/109 |
| 5,689,081 A | * | 11/1997 | Tsurumi ...................... 84/609 |
| 5,799,157 A | * | 8/1998 | Escallon ..................... 395/227 |
| 5,809,242 A | | 9/1998 | Shaw et al. |
| 5,860,068 A | * | 1/1999 | Cook .......................... 705/26 |
| 5,920,701 A | * | 7/1999 | Miller et al. .......... 395/200.58 |
| 5,943,422 A | * | 8/1999 | Van Wie et al. ................ 380/9 |

(Continued)

FOREIGN PATENT DOCUMENTS

EP    0569816    11/1993

(Continued)

OTHER PUBLICATIONS

Abram-Profeta et al, "Schedulign Video Programs in Near Video-on-Demand Systems", 1997, ACM Press, Proceedings of the fifth ACM international conference on Multimedia, p. 359-369.*

*Primary Examiner*—James P. Trammell
*Assistant Examiner*—Jalatee Worjloh

(57) ABSTRACT

In a digital content distribution method to distribute digital contents via a network, distribution of a digital content is instructed according to a distribution schedule, the digital content is distributed according to the distribution schedule indicated, and a particular digital content is selected from the digital contents distributed and is then sold, thereby conducting the distribution of digital contents at a high speed.

7 Claims, 14 Drawing Sheets

U.S. PATENT DOCUMENTS

| | | | | |
|---|---|---|---|---|
| 6,055,314 | A * | 4/2000 | Spies et al. | 380/228 |
| 6,226,618 | B1 * | 5/2001 | Downs et al. | 705/1 |
| 6,385,596 | B1 * | 5/2002 | Wiser et al. | 705/51 |
| 2002/0002468 | A1 * | 1/2002 | Spagna et al. | 705/1 |
| 2002/0002488 | A1 * | 1/2002 | Muyres et al. | 705/14 |

FOREIGN PATENT DOCUMENTS

| | | |
|---|---|---|
| EP | 0649121 | 4/1995 |
| EP | 0809221 A2 * | 6/1995 |
| EP | 0809221 A2 * | 6/1997 |
| EP | 0809221 A2 * | 11/1997 |
| EP | 1016948 | 7/2000 |
| EP | 1017001 | 7/2000 |
| EP | 1017003 | 7/2000 |
| JP | 1105656 | 4/1989 |
| JP | 619933 | 1/1994 |
| JP | 1049583 | 2/1998 |
| JP | 10049583 | 2/1998 |
| JP | 1091683 | 4/1998 |
| JP | 10254850 | 9/1998 |
| JP | 2000194634 | 7/2000 |
| JP | 2000194638 | 7/2000 |
| JP | 2000194763 | 7/2000 |
| WO | 9202888 | 2/1992 |
| WO | 9730425 | 8/1997 |

* cited by examiner

METHOD OF AND A SYSTEM FOR DISTRIBUTING DIGITAL CONTENTS

CROSS-REFERENCES TO RELATED APPLICATIONS

This application is related to application Ser. No. 09/473,278, filed by Koike on Dec. 28, 1999, corresponding to Japanese Patent Application No. 10-372543, the content of which is incorporated herein by reference in its entirely.

This application is related to application Ser. No. 09/473,298, filed by Koike on Dec. 28, 1999, corresponding to Japanese Patent Application No. 10-373650, the content of which is incorporated herein by reference in its entirely.

This application is related to application Ser. No. 09/473,275, filed by Koike on Dec. 28, 1999, corresponding to Japanese Patent Application No. 10-373649, the content of which is incorporated herein by reference in its entirely.

BACKGROUND OF THE INVENTION

The present invention relates to a digital content distribution system to distribute contents, and in particular, to a technology efficiently applicable to a digital content distribution system in which an original document such as a book is digitized into a digital content and the content digitized is distributed from a content database center to stores such that a digital content selected by a customer is sold in the stores.

Thanks to the spread of the Internet, electronic commerce has been developed and hence attention has been attracted to sales of a digital content which can be sold and delivered through a network. Additionally, it has been expected that the contents of information (such as novels, comics, music, and games) which have been sold as articles or package media through existing distribution routes are digitized and are distributed and sold through networks.

In accordance with the background art to sell the digitized content, there has been actually developed business, for example, mail-order selling of various contents and download of a digital content itself via a network at an electronic mall site of the Internet, a service of a terminal at a store such as a convenience store to copy a content desired by a customer from a storage media onto a supply media, and a service to deliver information using a telephone service number.

JP-A-10-254850 describes an information system and an information generating method for use with the system which distributes information generated or edited using information items dispersed in a network. In the system, new information is generated using information items dispersed in the network and is distributed via the network. This facilitates editing of information such as generation and modification thereof according to processing conditions such as an audiovisual environment and a generation environment of information.

Distribution and sales using paper as media play at present a central role in the distribution and sales of contents. In the distribution via such paper media, a print format of the contents on sheets of paper and a bundling form of the sheets influence a way of distribution and an audiovisual way, which forms the present culture. There is consequently needed a digital content distribution system in which the way of distribution and the audiovisual way are preserved and the culture accumulated is inherited and the contents using the paper media are digitized into digital contents to change the existing system to a system in which the contents are distributed and sold via a network. The digital content distribution system thereby solves distribution problems of the existing distribution media such as the environmental problems, the problem of the latest one of the contents, the problem of the returning and discarding of goods, and the problem of distribution cost.

In the background art to sell a digital content, although the selling of the digital content itself is carried out, the content is not distributed in the form of digital data entirely through the digital content distribution system. This leads to a problem that a digital content generated through the digitization cannot be immediately distributed to a store to be sold to a customer.

That is, in the background art to sell a digital content, an ordinary distribution such as delivery of a compact disk read-only memory (CD-ROM) in which a digital content is stored appears at an intermediate point of the digital content distribution system. Consequently, there exists a problem that a period of several days is required for the delivery of a digital content of a new item and the delivery of a digital content ordered by a customer.

When a digital content is sold via a network, the digital content is beforehand copied onto a recording media. However, in the background art above, there has not been clearly established a system in which the license fee of the digital content is collected according to the number of copies to pay the collected amount to the content holder. This consequently leads to a problem of possibility that the license fee is not paid to the content holder according to the number of copies sold.

For the content already distributed, the configuration itself in which the user listens to or views the content is an important point. Namely, since items distributed in the form of publications have a style of books, there has already been established a method to find out books, and the readers have a manner to read a book in a page-by-page fashion by turning over pages.

However, in the related art to sell a digital content, since the digitization is not achieved to reproduce with possible fidelity to the configurations such as the appearance of articles of publications and CDs actually distributed, the appearance of the original book of the content considerably varies from that of the digital content attained by digitizing the original book in some cases. This leads to a problem of difficulty in the handling of the digital content in the same way as for the actual item. For example, when only text data of a book is inputted to generate an electronic book, since information of appearance of the book such as a cover and a backbone of the book is lost, it is difficult to search for the electronic book including only the text data in a way similar to that used to search for a book which a customer just happened to see in an advertisement or to search for a well-known book in a store by visually checking its cover and backbone.

SUMMARY OF THE INVENTION

It is therefore an object of the present invention to provide a technology capable of distributing the digital content at a high speed, thereby solving the problem above.

Another object of the present invention is to provide a technology capable of distributing a license fee to a content holder according to the number of digital contents sold.

In accordance with the present invention, there is provided a digital content distribution system to distribute a digital content via a network in which digital contents are distributed via the network and are sold to customers and a license fee is distributed to a content holder of the contents according to the number of contents sold.

In a digital content distribution system of the present invention, an original document of a content is received from a content holder who possesses the content and then the content is digitized in a digitization center into a digital content. The digital content generated is acknowledged and then is accumulated in a content database center.

The content database center generates a distribution schedule to distribute digital contents and sends therefrom a plurality of digital contents to shops or stores according to the distribution schedule. It may also be possible to classify a plurality of stores into particular groups such as a group of stores of a particular chain and a plurality of distribution management centers are installed to manage distribution to stores of the respective groups such that the distribution is carried out via these centers.

The store copies on a media or downloads in a viewer device a particular digital content selected by a customer from the distributed digital contents and sells the content to the customer.

If the digital content requested by the customer has not been distributed to the store, the store transmits a distribution request via the distribution management center to the content database center for an on-demand distribution of the digital content. When the digital content distributed on-demand passes through the distribution management center, the content is cached in the content database center. When the same distribution request is issued from another store managed by the distribution management center, the content is distributed on-demand from the distribution management center to the store of the distribution request without using the content database center.

In each store, when a digital content is sold, the contents of the sale are stored in a magnetic disk device to collect sales information. The content database center receives via the distribution management center the sales information collected in the respective stores, calculates the license fee by totaling associated amounts, and remits the license fee to the content holder.

As above, in accordance with the digital content distribution system of the present invention, the distribution of digital contents from the content database center to the stores is conducted entirely via the network and hence can be achieved at a high speed.

The objects and features of the present invention will become more apparent from the consideration of the following detailed description taken in conjunction with the accompanying drawings.

DESCRIPTION OF THE EMBODIMENTS

Next, description will be given of an embodiment of a digital content distribution system in accordance with the present invention in which an electronic book generated by digitizing a book is sold in shops such as a bookstore and a convenience store.

Figure 1:
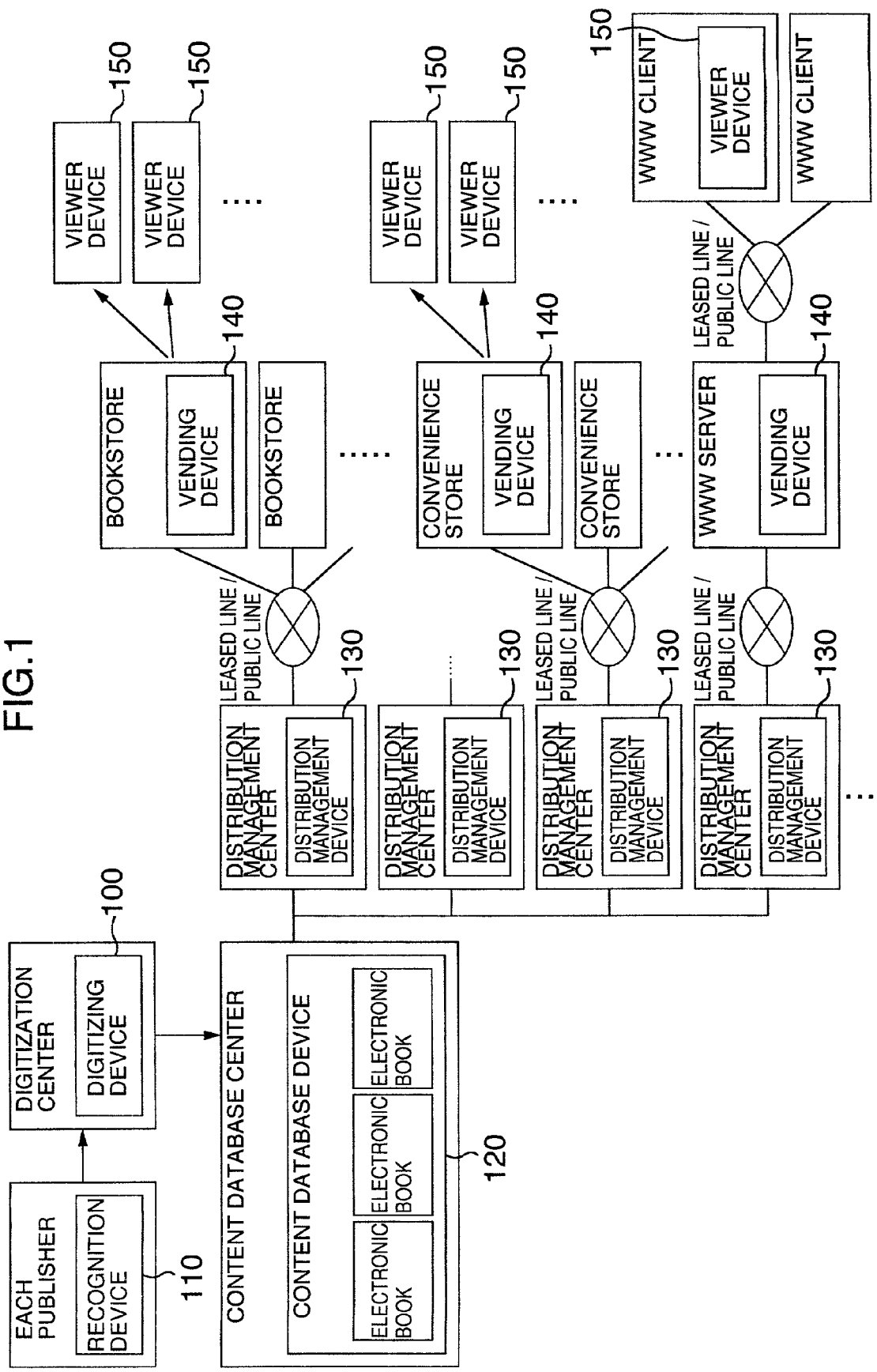
FIG. 1 is a diagram showing an outline of constitution of an embodiment of a digital content distribution system in accordance with the present invention.

FIG. 1 shows in a diagram an outline of constitution of an embodiment of the digital content distribution system. As shown in FIG. 1, the digital content distribution system of this embodiment includes a digitizing device 100, a recognition device 110, a content database device 120, distribution management devices 130, vending devices 140, and viewer devices 150.

Digitizing device 100 is a device which generates an electronic book by digitizing an original document of a book and which receives a recognition message from recognition device 110 to send the electronic book to content database device 120. Recognition device 110 is a device to recognize on the side of a publisher the contents of the electronic book generated by digitizing device 100.

Content database device 120 is a device in which the electronic book generated by digitizing device 100 is stored. Distribution management device 130 is a device which converts a communication protocol between content database device 120 and vending device 140 to absorb discrepancy with respect to interface and which manages distribution of electronic books to vending devices 140 connected to the pertinent distribution management device.

Vending device 140 is a device which sells an electronic book to a customer by copying the electronic book selected by the customer onto a media or by down-loading the electronic book into viewer device 150. Viewer device 150 is a device to replay the electronic book purchased via vending device 140.

As shown in FIG. 1, a plurality of distribution management centers are connected via a network to one content database center in the embodiment. Moreover, a plurality of shops, i.e., bookstores and world wide web (WWW) servers in a convenience store and/or an electronic mall are connected via a network to one distribution management center. A network in this context is a communication path to distribute digital contents from a predetermined place to another predetermined place and includes both of a wire communication path and a wireless communication path.

The distribution management center is a center which converts a transmission protocol between the content database center and the stores. When the plural shops are classified into particular groups such as shops of a chain, the distribution management center manages, for each group, the distribution to a plurality of shops belonging to the group. The distribution management center may be configured to connect shops, which do not belong to any group, directly to the content database center without using the distribution management center. Since the shops belonging to one group are assumed as those of an identical type such as shops of a chain as above, it is possible, for example, when the shops are convenience stores, to make a distribution schedule suitable for shops of the group. For example, the distribution is conducted by placing emphasis on magazines and the like. As shown in FIG. 1, a distribution management center may be installed for each group, namely, there may be disposed a plurality of distribution management centers. Alternatively, a plurality of groups may be connected to one distribution management center to manage each group in a separate fashion in the distribution management center.

Figure 2:
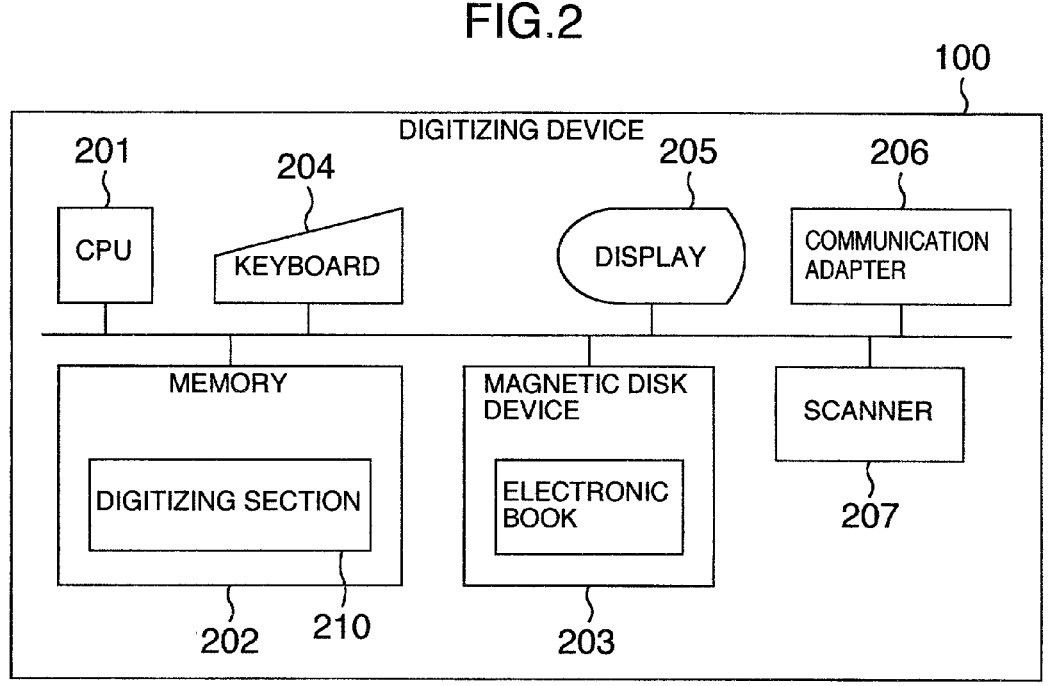
FIG. 2 is a diagram showing an outline of constitution of a digitization device of the embodiment.

FIG. 2 shows an outline of constitution of digitizing device 100 of the embodiment. As shown in FIG. 2, digitizing device 100 of the embodiment includes a central processing unit (CPU) 201, a memory 202, a magnetic disk device 203, a keyboard 204, a display 205, a communication adapter 206, and a scanner 207.

CPU 201 is a controller to control the overall operation of digitizing device 100. Memory 202 is a storage in which various processing programs and data are loaded to control operation of digitizing device 100. Magnetic disk device 203 is a storage in which various processing program above and data of electronic books and the like are stored.

Keyboard 204 is an input device to input an instruction of operation and the like to digitizing device 100. Display 205 is an output device to display a state of operation or the like of digitizing device 100. Communication adapter 206 is an adapter to conduct communication with another device. Scanner 207 is a device to read an original book of a publication in a form of image data.

Digitizing device 100 includes a digitizing section 210. Digitizing section 210 is a processing section which generates an electronic book by digitizing an original book of a publication, requests recognition device 110 to recognize the contents of the electronic book, and sends the electronic book recognized to content database device 120.

It is assumed that a program to make digitizing device 100 function as digitizing section 210 is recorded on a recording media such as a CD-ROM to be then stored on a magnetic disk or the like to be thereafter loaded on a memory for execution thereof. In this connection, the program may be recorded on a media other than the CD-ROM.

Figure 3:
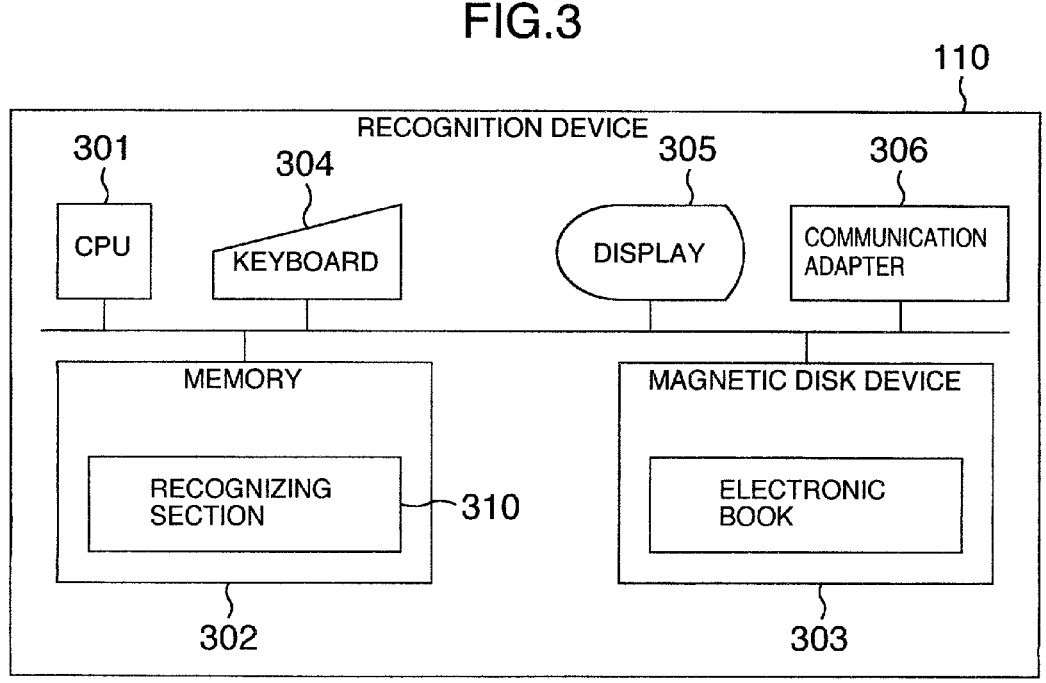
FIG. 3 is a diagram showing an outline of constitution of a recognition device of the embodiment.

FIG. 3 is shows an outline of constitution of recognition device 110 of the embodiment. As can be seen from FIG. 3, recognition device 110 of the embodiment includes a CPU 301, a memory 302, a magnetic disk device 303, a keyboard 304, a display 305, and a communication adapter 306.

CPU 301 is a controller to control the overall operation of recognition device 110. Memory 302 is a storage in which various processing programs and data are loaded to control operation of digitizing device 110. Magnetic disk device 303 is a storage in which various processing program above and data of electronic books and the like are stored.

Keyboard 304 is an input device to input an instruction of operation and the like to recognition device 110. Display 305 is an output device to display a state of operation or the like of digitizing device 110. Communication adapter 306 is an adapter to conduct communication with another device.

Recognition device 110 includes a recognizing section 310. Recognizing section 310 is a processing section to display the contents of an electronic book which are requested digitizing device 100 for confirmation. The section sends a message indicating whether or not the contents of the electronic book are recognized to digitizing device 100.

It is assumed that a program to make recognition device 110 function as recognizing section 310 is recorded on a recording media such as a CD-ROM and is then stored on a magnetic disk or the like to be thereafter loaded on a memory for execution thereof. The program may be recorded on a media other than the CD-ROM.

Figure 4:
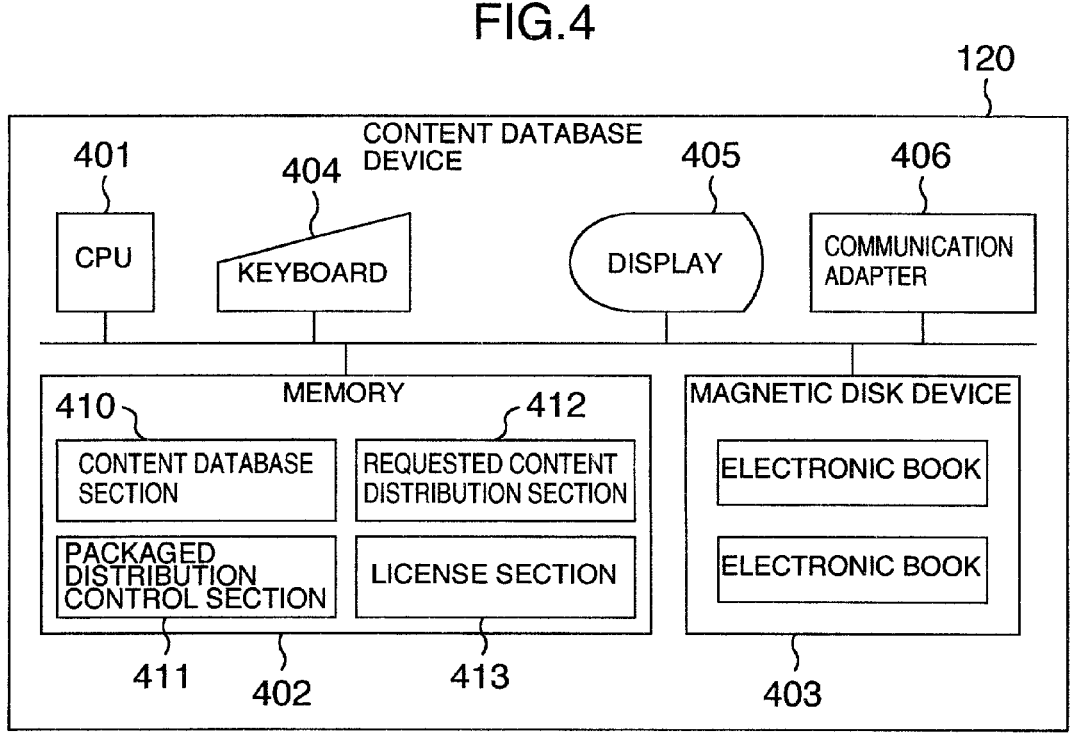
FIG. 4 is a diagram showing an outline of constitution of a content database device of the embodiment.

FIG. 4 shows an outline of constitution of content database device 120 of the embodiment. As shown in FIG. 4, content database device 120 of the embodiment includes a CPU 401, a memory 402, a magnetic disk device 403, a keyboard 404, a display 405, and a communication adapter 406.

CPU 401 is a controller to control the overall operation of content database device 120. Memory 402 is a storage in which various processing programs and data are loaded to control operation of content database device 120. Magnetic disk device 403 is a storage in which various processing program above and data of electronic books and the like are stored.

Keyboard 404 is an input device to input an instruction of operation and the like to content database device 120. Display 405 is an output device to display a state of operation or the like of content database device 120. Communication adapter 406 is an adapter to conduct communication with another device.

Content database device 120 includes a content database section 410, a distribution control section 411, a requested content distribution section 412, and a license section 413.

Content database section 410 is a processing section which receives an electronic book generated by digitizing device 100 to store the electronic book in magnetic disk device 403. Distribution control section 411 is a processing section which generates a distribution schedule to distribute an electronic book to vending device 140 and which instructs distribution management device 130 to distribute the electronic book according to the distribution schedule. Requested content distribution section 412 is a processing section which receives a distribution request from vending device 140 and relayed by distribution management device 130 and which transmits to distribution management device 130 an electronic book for which the distribution request has been issued.

License section 413 is a processing section which totals for each electronic book the sales information collected by each vending device 140, calculates a license fee of each electronic book according to the sales information totaled, and remits the license fee calculated for each electronic book to each publisher.

It is assumed that a program to make content database device 120 function as content database section 410, distribution control section 411, requested content distribution section 412, and license section 413 is recorded on a recording media such as a CD-ROM and is then stored on a magnetic disk or the like to be thereafter loaded on a memory for execution thereof. The program may be recorded on a media other than the CD-ROM.

Figure 5:
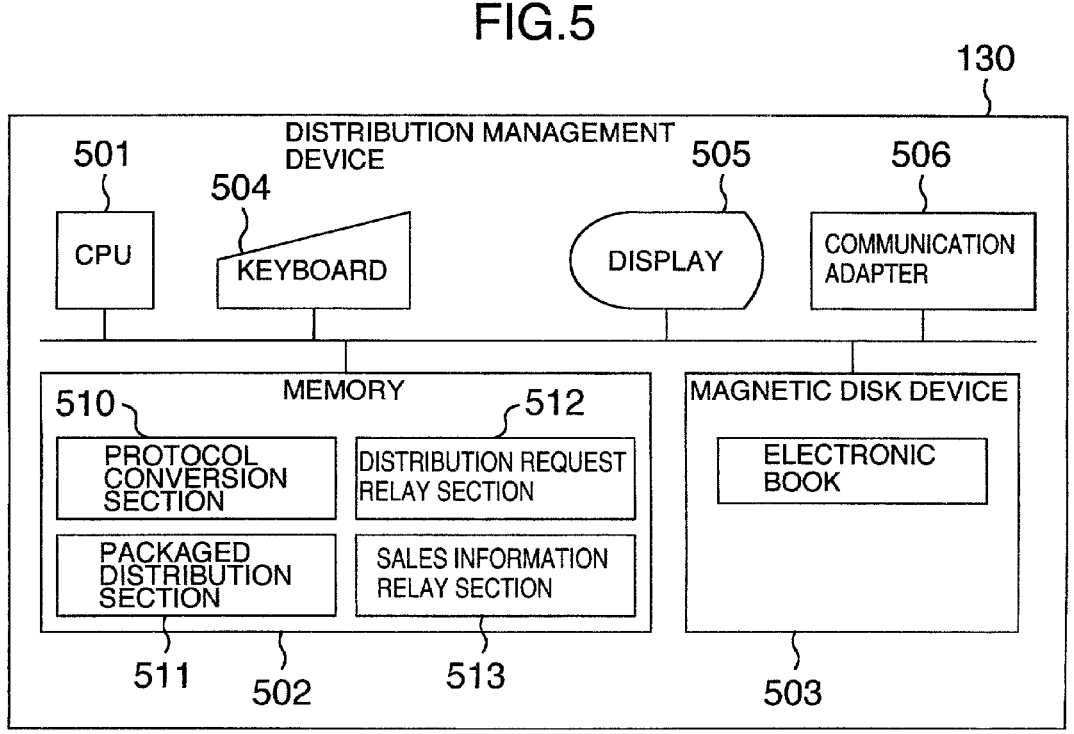
FIG. 5 is a diagram showing an outline of constitution of a distribution management device of the embodiment.

FIG. 5 is shows an outline of constitution of distribution management device 130 of the embodiment. As shown in FIG. 5, distribution management device 130 of the embodiment includes a CPU 501, a memory 502, a magnetic disk device 503, a keyboard 504, a display 505, and a communication adapter 506.

CPU 501 is a controller to control the overall operation of distribution management device 130. Memory 502 is a storage in which various processing programs and data are loaded to control operation of distribution management device 130. Magnetic disk device 503 is a storage in which various processing program above and data of electronic books and the like are stored.

Keyboard 504 is an input device to input an instruction of operation and the like to distribution management device 130. Display 505 is an output device to display a state of operation or the like of distribution management device 130. Communication adapter 506 is an adapter to conduct communication with another device.

Distribution management device 130 includes a protocol conversion section 510, a distribution section 511, a requested content relay section 512, and a sales information relay section 513.

Protocol conversion section 510 is a processing section which mutually converts a communication protocol between content database device 120 and vending device 140 to absorb discrepancy with respect to interface. Distribution section 511 is a processing section to distribute an electronic book to vending device 140 according to a distribution schedule indicated by content database device 120.

Requested content relay section 512 is a processing section which relays a distribution request from vending device 140 to content database device 120 and which distributes an electronic book sent from content database device 120 in response to the distribution request to vending device 140. Sales information relay section 513 is a processing section to relay sales information from vending device 140 to content database device 120.

It is assumed that a program to make distribution management device 130 function as protocol conversion section 510, distribution section 511, requested content relay section 512, and sales information relay section 513 is recorded on a recording media such as a CD-ROM to be then stored on a magnetic disk or the like and is thereafter loaded on a memory for execution thereof. The program may be recorded on a media other than the CD-ROM.

Figure 6:
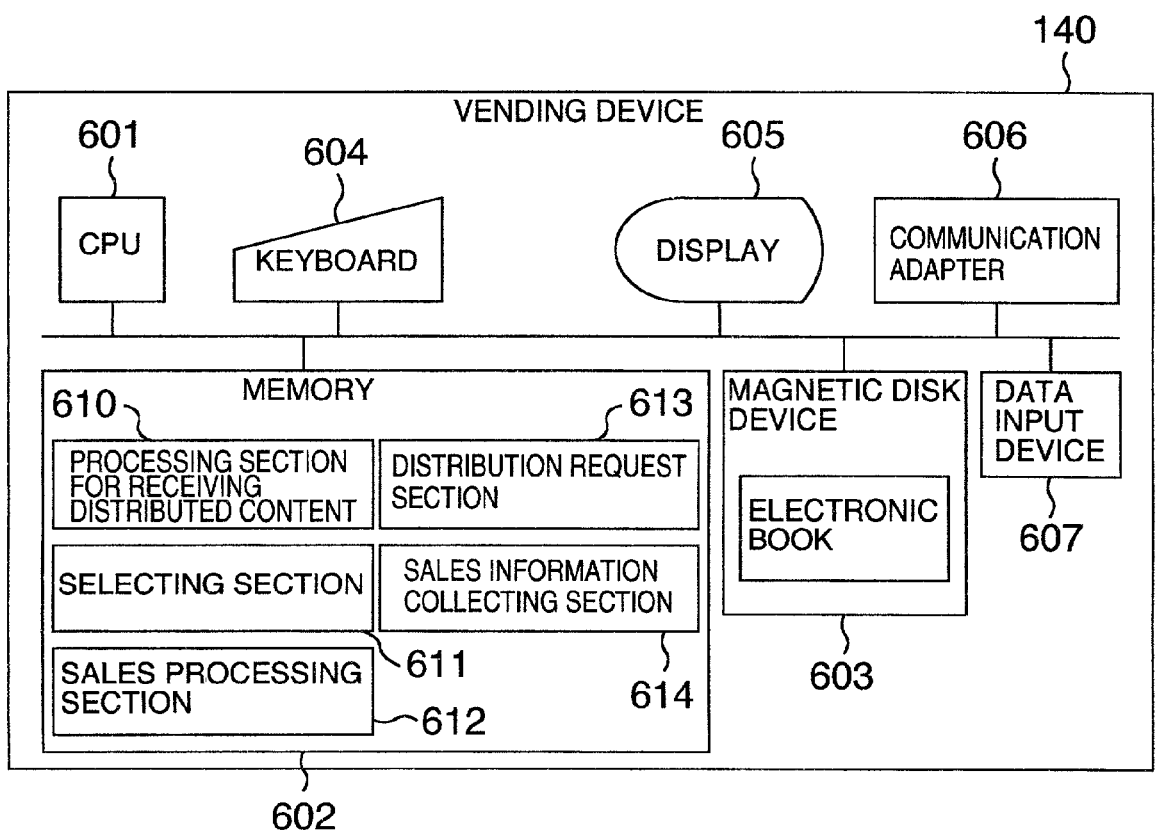
FIG. 6 is a diagram showing an outline of constitution of a vending device of the embodiment.

FIG. 6 shows an outline of constitution of vending device 140 of the embodiment. As can be seen from FIG. 6, vending device 140 of the embodiment includes a CPU 601, a memory 602, a magnetic disk device 603, a keyboard 604, a display 605, a communication adapter 606, and a data input device 607.

CPU 601 is a controller to control the overall operation of vending device 140. Memory 602 is a storage in which various processing programs and data are loaded to control operation of vending device 140. Magnetic disk device 603 is a storage in which various processing program above and data of electronic books and the like are stored.

Keyboard 604 is an input device to input an instruction of operation and the like to vending device 140. Display 605 is an output device to display a state of operation or the like of vending device 140. Communication adapter 606 is an adapter to conduct communication with another device. Data input device is a device to write a selected electronic book on a media.

Vending device 140 includes a processing section for receiving distributed content 610, a selecting section 611, a sales processing section 612, a distribution request section 613, and a sales information collecting section 614.

Processing section for receiving distributed content 610 is a processing section which receives an electronic book distributed from distribution management device 130 to store the electronic book in magnetic disk device 603. Selecting section 611 is a processing section to receive information of an identifier of a particular electronic book selected from information for goods of electronic books by a customer.

Sales processing section 612 is a processing section to sell a particular electronic book selected by a customer. Distribution request section 613 is a processing section to send a distribution request of an electronic book selected by a customer to distribution management device 130. Sales information collecting section 614 is a processing section which collects sales information of an electronic book sold by vending device 140 to send the collected information to content database device 120.

It is assumed that a program to make vending device 140 function as processing section for receiving distributed content 610, selecting section 611, sales processing section 612, distribution request section 613, and sales information collecting section 614 is recorded on a recording media such as a CD-ROM to be then stored on a magnetic disk or the like and is thereafter loaded on a memory for execution thereof. The program may be recorded on a media other than the CD-ROM.

Next, description will be given of processing of the embodiment of the digital content distribution system in which a book possessed by a publisher is digitized into an electronic book, i.e., a digital content.

Figure 7:
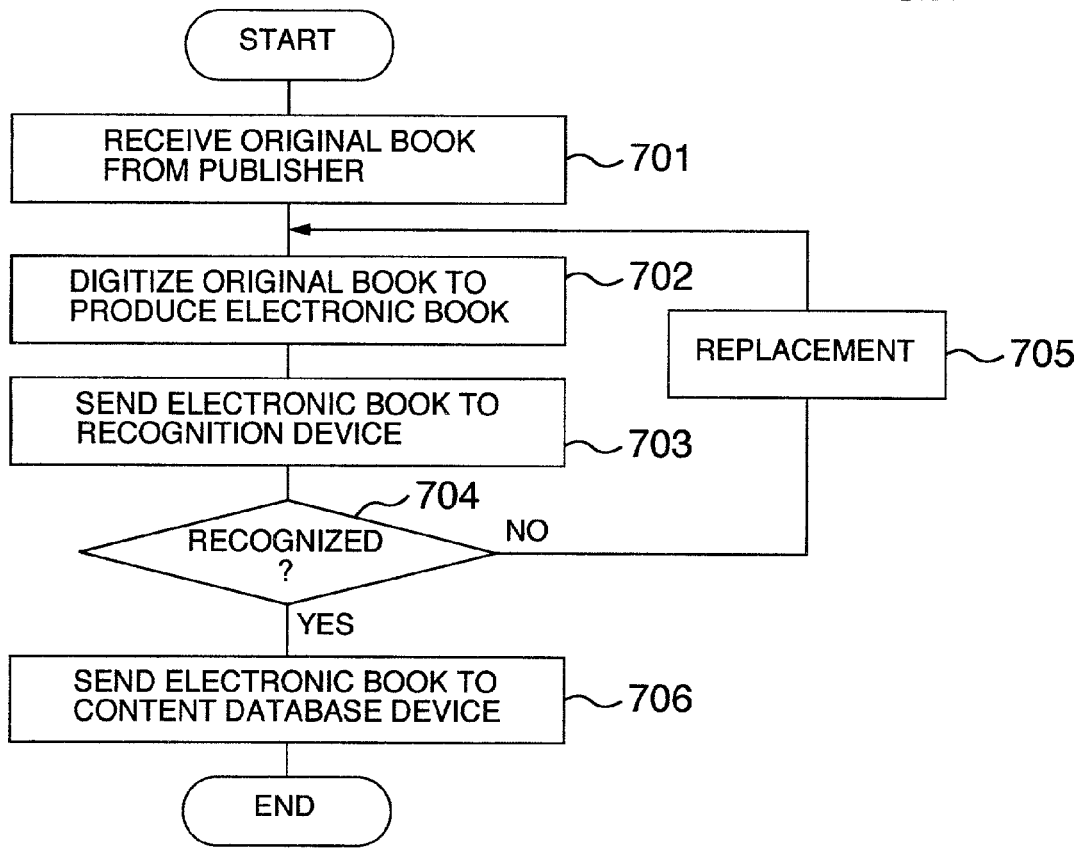
FIG. 7 is a flowchart showing a processing procedure of a digitizing section of the embodiment.

FIG. 7 is a flowchart showing a processing procedure of digitizing section 210 of the embodiment. After having received an original book from a publisher in step 701, digitizing section 210 of digitizing device 100 digitizes in step 702 the received original book to generate an electronic book and information for goods of the electronic book. In step 703, digitizing section 210 sends the digitized book thus digitized to recognition device 110 of the publisher and then awaits a response from recognizing section 310.

Figure 8:
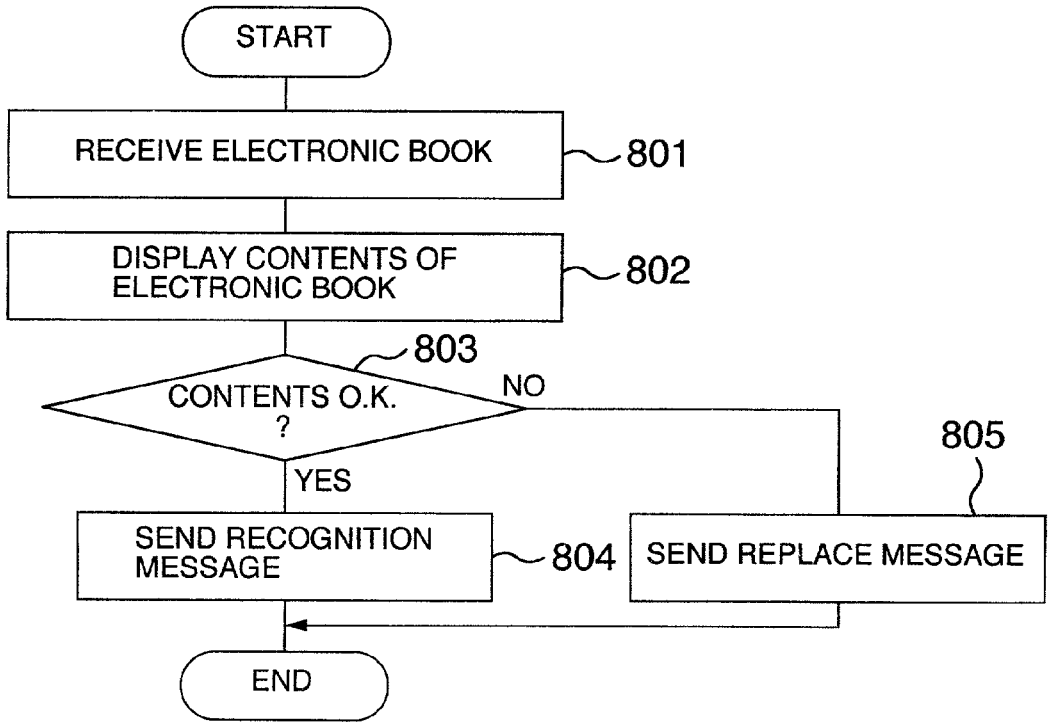
FIG. 8 is a flowchart showing a processing procedure of a recognizing section of the embodiment.

FIG. 8 is a flowchart showing a processing procedure of recognizing section 310 of the embodiment. Recognizing section 310 of recognition device 110 receives in step 801 the electronic book generated by digitizing device 100 then displays in step 802 the contents of the received electronic book on display 305.

In step 803, recognizing section 310 receives an input from an operator. If the contents of operation inputted from the operator indicate recognition of the contents of the electronic book, processing goes to step 804 to transmit a recognition message to digitizing device 100. If the contents of operation inputted from the operator indicate replacement of the electronic book, processing goes to step 805 to transmit to digitizing device 100 the contents of replacement inputted from the operator.

Instep 704, digitization section 210 of digitizing device 100 examines the contents of a response message from the publisher. If replacement is required for the electronic book generated in step 702, digitizing section 210 conducts processing of replacement in step 705 and then control returns to step 702 to again execute processing beginning at the digitization. If the contents of the electronic book generated in step 702 is recognized, digitizing section 210 sends the electronic book to content database section 410 of content database device 120 in step 706.

Figure 9:
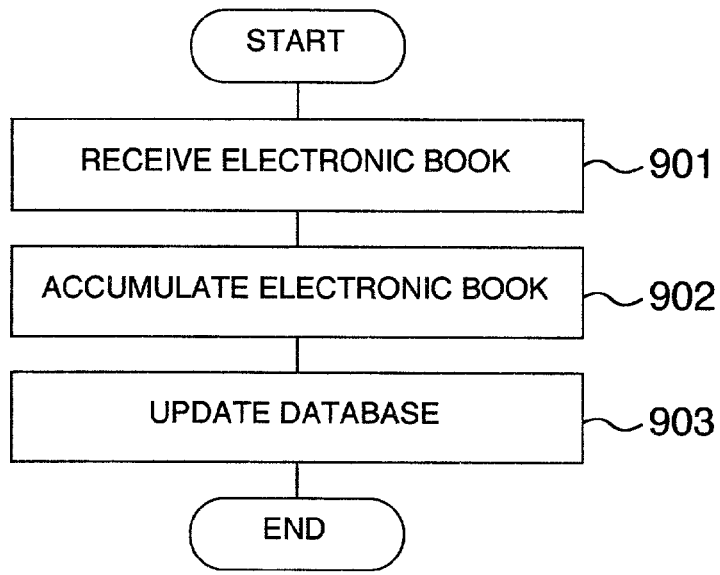
FIG. 9 is a flowchart showing a processing procedure of a content database section of the embodiment.

FIG. 9 is a flowchart showing a processing procedure of content database section 410 of the embodiment. In step 901, content database section 410 of content database device 120 receives an electronic book and information for goods of the book which have been sent from digitizing device 100. In step 902, section 410 accumulates the electronic book and the information for goods in a database of magnetic disk device 403. Thereafter, in step 903, section 410 executes database update processing such as update of an index.

Next, description will be given of processing in the embodiment of the digital content distribution system in which an electronic book accumulated in content database device 120 is first distributed to vending device 140 to be thereafter sold.

Figure 10:
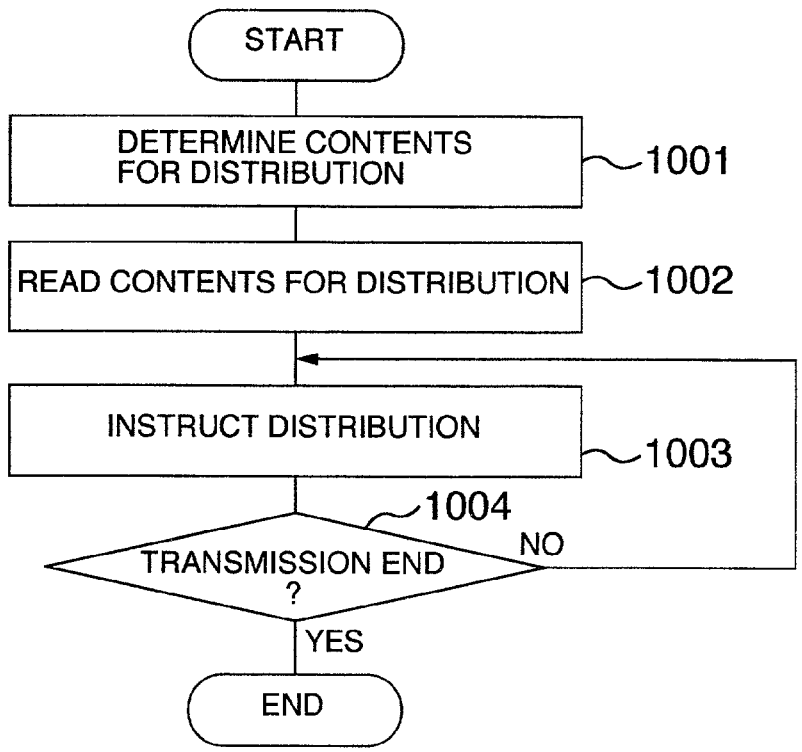
FIG. 10 is a flowchart showing a processing procedure of a distribution control section of the embodiment.

FIG. 10 is a flowchart showing a processing procedure of distribution control section 411 of the embodiment. In step 1001, distribution control section 411 of content management device 120 generates a distribution schedule to distribute an electronic book to vending device 140. In step 1002, section 411 reads out an electronic book and information for goods of the book distributed according to the distribution schedule.

In step 1003, section 411 sends the distribution schedule generated and the obtained electronic book and information for goods to distribution management device 130 to instruct device 130 to distribute the electronic book according to the distribution schedule. In step 1004, section 411 makes a check, for each distribution management device which conducts the distribution processing according to the distribution schedule, to determine whether or not the distribution instruction is completed for the device. If the instruction has not been completed to the device, control returns to step 1003 to continue the processing; and if completed, the processing is terminated.

Figure 11:
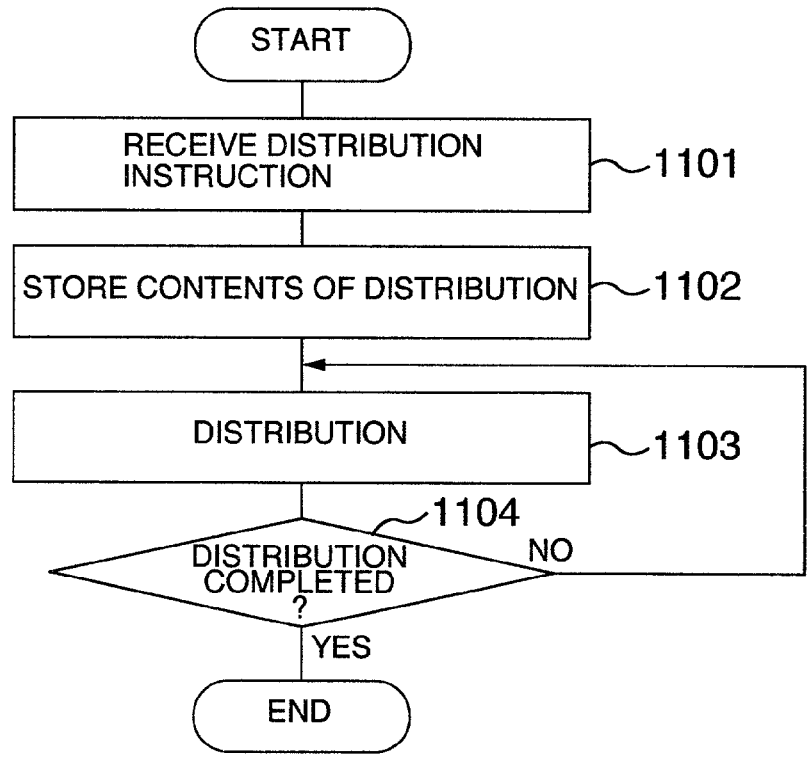
FIG. 11 is a flowchart showing a processing procedure of a distribution section of the embodiment.

FIG. 11 is a flowchart showing a processing procedure of distribution section 511 of the embodiment. In step 1101, distribution section 511 of distribution management device 130 receives a distribution instruction including a distribution schedule, an electronic book, and information for goods of the book from content database device 120. In step 1102, section 511 stores in magnetic disk device 503 the distribution schedule, the electronic book, and the information for goods thus received.

In step 1103, section 511 distributes, by converting by protocol conversion section 510 a communication protocol between content database device 120 and vending device 140, the electronic book and the information for goods to each vending device 140 associated therewith according to the distribution schedule. In step 1104, section 511 makes a check, for each vending device for which the distribution processing is conducted according to the distribution schedule, to determine whether or not the distribution of the electronic book and the information for goods to the vending device has been completed. If the distribution to the vending device has not been completed, control returns to step 1103 to continue the processing. If the distribution has been completed, the processing is terminated. It may also be possible to use broadcast communication to a plurality of vending devices 140 via a communication satellite or the like. Namely, the electronic book and the information for goods are distributed at once to each vending device for which the distribution processing is conducted according to the distribution schedule.

Figure 12:
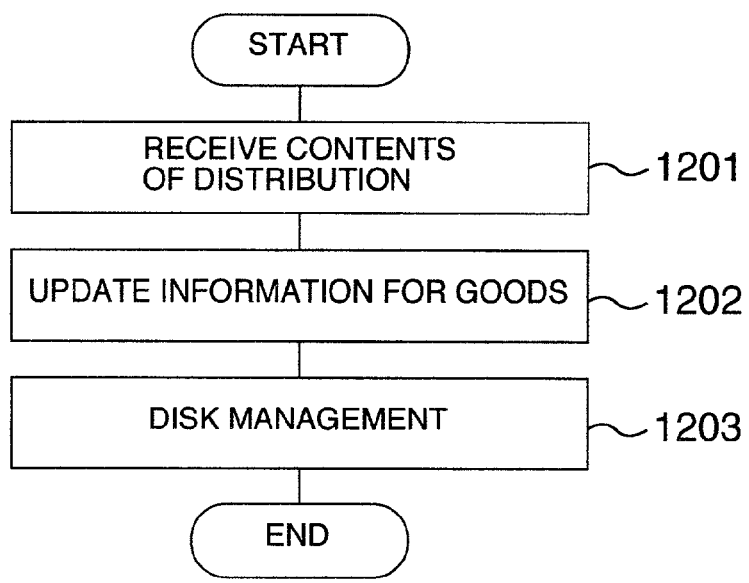
FIG. 12 is a flowchart showing a processing procedure of a processing section for receiving distributed content of the embodiment.

FIG. 12 is a flowchart showing a processing procedure of processing section for receiving distributed content 610 of the embodiment. In step 1201, section 610 of vending device 140 receives the electronic book and the information for goods distributed from distribution management device 130 and then stores the electronic book and the information for goods in magnetic disk device 603. In step 1202, section 610 adds the received information for goods to the existing information for goods to thereby update data, which is used in retrieval processing when a customer selects an electronic book for the purchase thereof. In step 1203, section 610 determines an available capacity of magnetic disk device 603 to conduct disk management processing such as processing which deletes, according to the value of the available capacity, data which has not been recently used for the sales processing.

Figure 13:
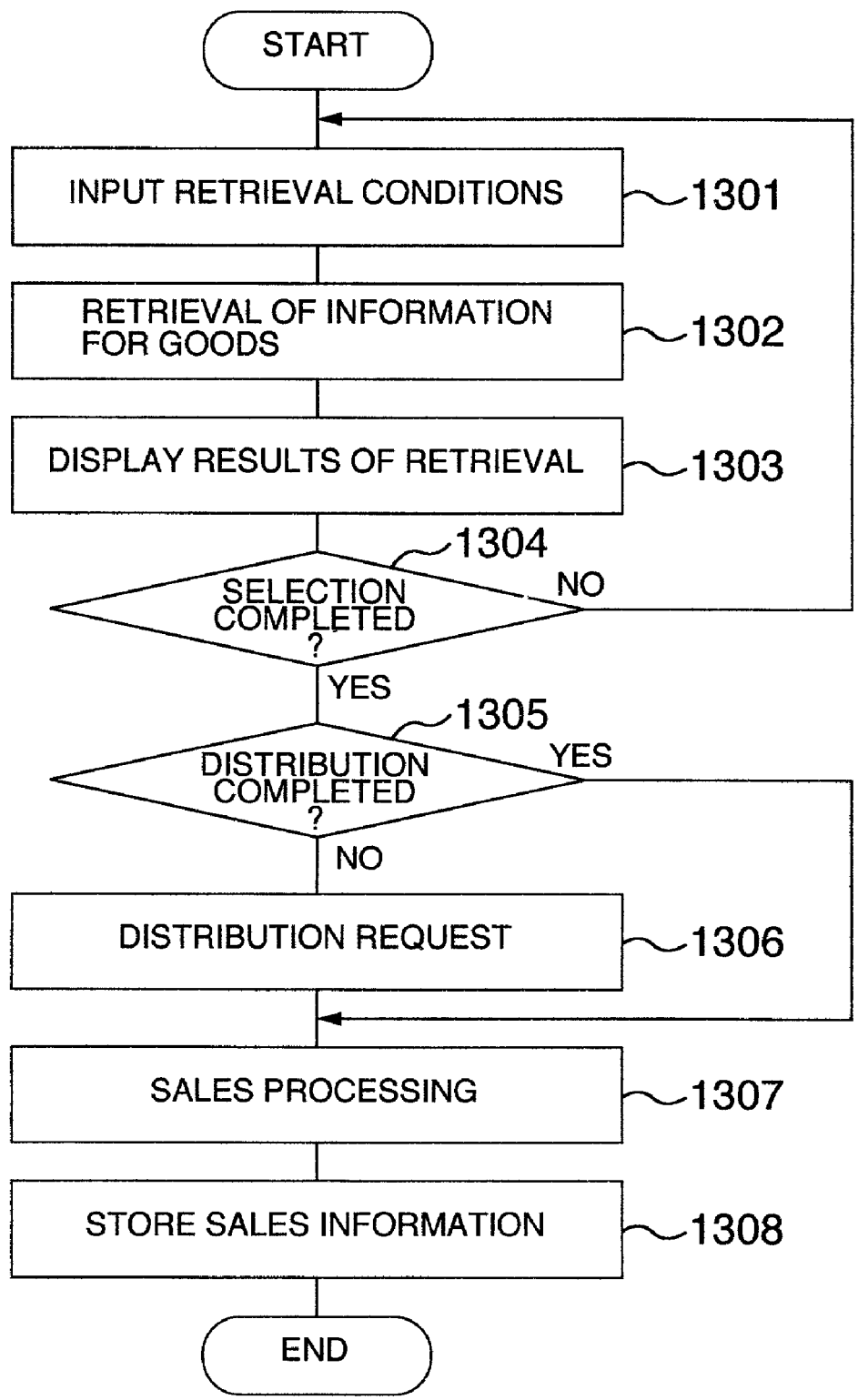
FIG. 13 is a flowchart showing a processing procedure of a sales processing section of the embodiment.

FIG. 13 is a flowchart showing a processing procedure of sales processing section 612 of the embodiment. In step 1301, selecting section 611 of vending device 140 displays on display 605 a graphical user interface (GUI) to conduct retrieval of an electronic book and then receives a retrieval condition inputted by a customer. When a retrieval condition is inputted by a customer, section 611 conducts in step 1302 retrieval through the information for goods in vending device 140 to read out an information item for goods of an electronic book which matches the received retrieval condition. In step 1303, section 611 displays on display 605 the information for goods of the electronic book obtained as a result of the retrieval and then receives an input of an electronic book selected by the customer.

In step 1304, section 611 makes a check to determine whether or not a particular electronic book has been selected in the displayed information for goods by the customer. If an electronic book has been selected, processing goes to step 1305. If the retrieval is again instructed, processing returns to step 1301 to receive an input of a retrieval condition.

In step 1305, sales processing section 612 checks to determine whether or not the electronic book selected by the customer has already been distributed. If the electronic book has already been distributed, processing goes to step 1307 to execute sales processing of the distributed electronic book. If the electronic book has not been distributed, processing goes to step 1306 in which section 612 transmits by distribution request section 613 the distribution request of the electronic book to distribution management device 130 to receive on-demand the distribution of the electronic book.

Figure 14:
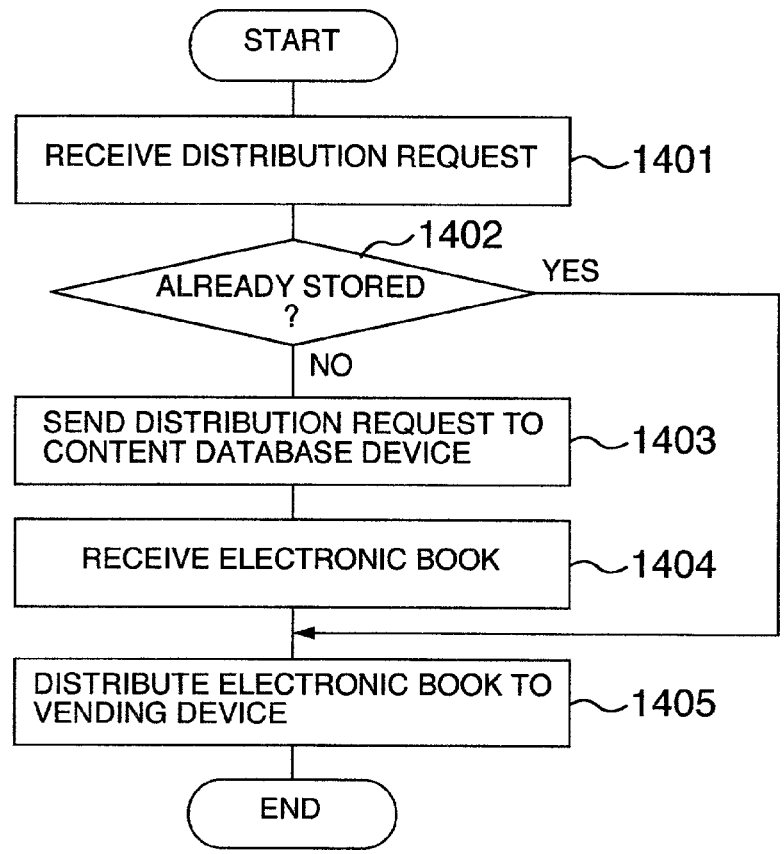
FIG. 14 is a flowchart showing a processing procedure of a processing section for relaying request content of the embodiment.

FIG. 14 is a flowchart showing a processing procedure of processing section for relaying request content 512 of the embodiment. In step 1401, section 512 receives a distribution request from vending device 140. In step 1402, section 512 makes a check to determine whether or not an electronic book requested by the distribution request has already been stored in magnetic disk device 503 of distribution management device 130. If the book has been stored in device 130, processing goes to step 1405; otherwise, processing goes to step 1403. In step 1403, section 512 sends the distribution request received from vending device 140 to content database device 120 while converting by protocol conversion section 510 a communication protocol between content database device 120 and vending device 140.

Figure 15:
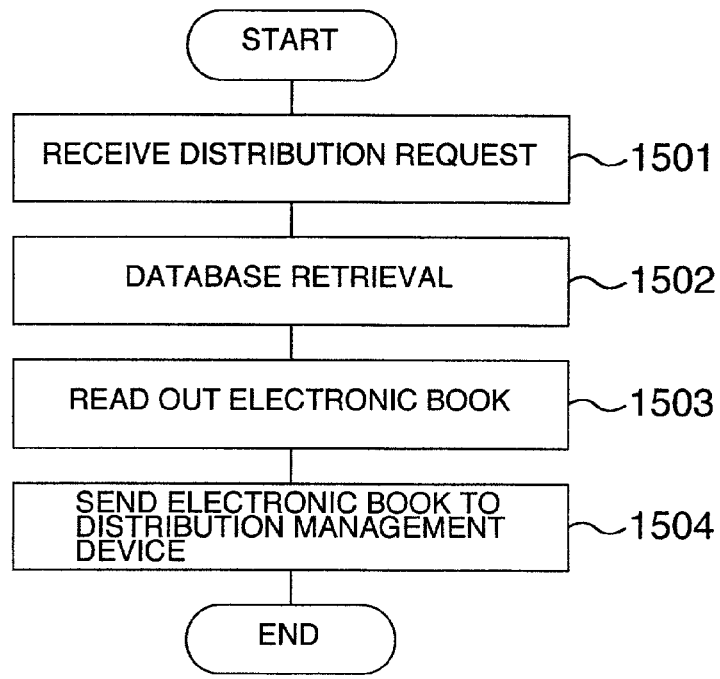
FIG. 15 is a flowchart showing a processing procedure of a requested content distribution section of the embodiment.

FIG. 15 is a flowchart showing a processing procedure of requested content distribution section 412 of the embodiment. In step 1501, section 412 of content database device 120 receives the distribution request sent from vending device 140 and relayed by distribution management device 130. In step 1502, section 412 makes retrieval for the electronic book requested by the distribution request received. In step 1503, section 412 reads out the electronic book as a result of the retrieval. In step 1504, section 412 sends the obtained electronic book to distribution management device 130 and instructs device 130 to distribute the book.

In step 1404, section 412 receives the electronic book sent from content database device 120 in response to the distribution request and stores the book in magnetic disk device 503. In step 1405, section 412 reads from disk device 503 the electronic book requested by vending device 140 according to the distribution request and distributes the book to vending device 140.

In step 1307, sales processing section 612 of vending device 140 conducts sales processing of the electronic book distributed from distribution management device 130 and then remits an amount of sale at vending device 140 to a license processing account. In step 1308, sales information collecting section 614 stores, as sales information indicating the contents of sales processing conducted by the processing above, an item identifier (ID) of the electronic book sold, a salesperson ID of a sales-person in charge of the sale, a personal identifier ID of a customer who purchased the book, a type of confirmation of payment, the year, month, and day of sale, and the like in magnetic disk device 603.

Digitizing section 210 of digitizing device 100 may also subdivide the original book of a publication in a predetermined unit such as a chapter or a page to digitize the book in the unit so as to generate an electronic book including a plurality of digital data blocks. It may also be possible that selecting section 611 of vending device 140 receives selection of an electronic book in the predetermined unit used in the subdivision of the book and sales processing section 612 sells the electronic book in the predetermined unit. In the digital content distribution system of the embodiment, the original book of the content may also be sold in an arbitrary unit used to subdivide the book as above. The system can consequently provide a more flexible service to the customers.

Digitizing section 210 of digitizing device 100 may digitize the original book of the publication into image data to thereby generate an electronic book. The external appearance of the original book of the content is reproduced as image data in this situation. Consequently, when compared with a situation in which characters of the book are inputted as text data and drawings of the book are inputted as image data such that the text data and image data are thereafter edited and digitized into an electronic book, it is not necessary to achieve the editing operation to reproduce the original book of the content with fidelity, and characters which cannot be expressed as text data can be expressed in this case.

When selecting section 611 of vending device 140 selects a particular electronic book, if image data of a cover and a backbone of the book generated above is displayed as information for goods, a state of an actual store in which books are placed side by side on a shelf can be reproduced on display 605 of vending device 140. This enables the customer to select an electronic book in an atmosphere as if he or she were in a bookstore.

Subsequently, description will be given of processing in the digital content distribution system of the embodiment in which an amount of profit is distributed to a publisher according to the number of electronic books sold by vending device 140.

Figure 16:
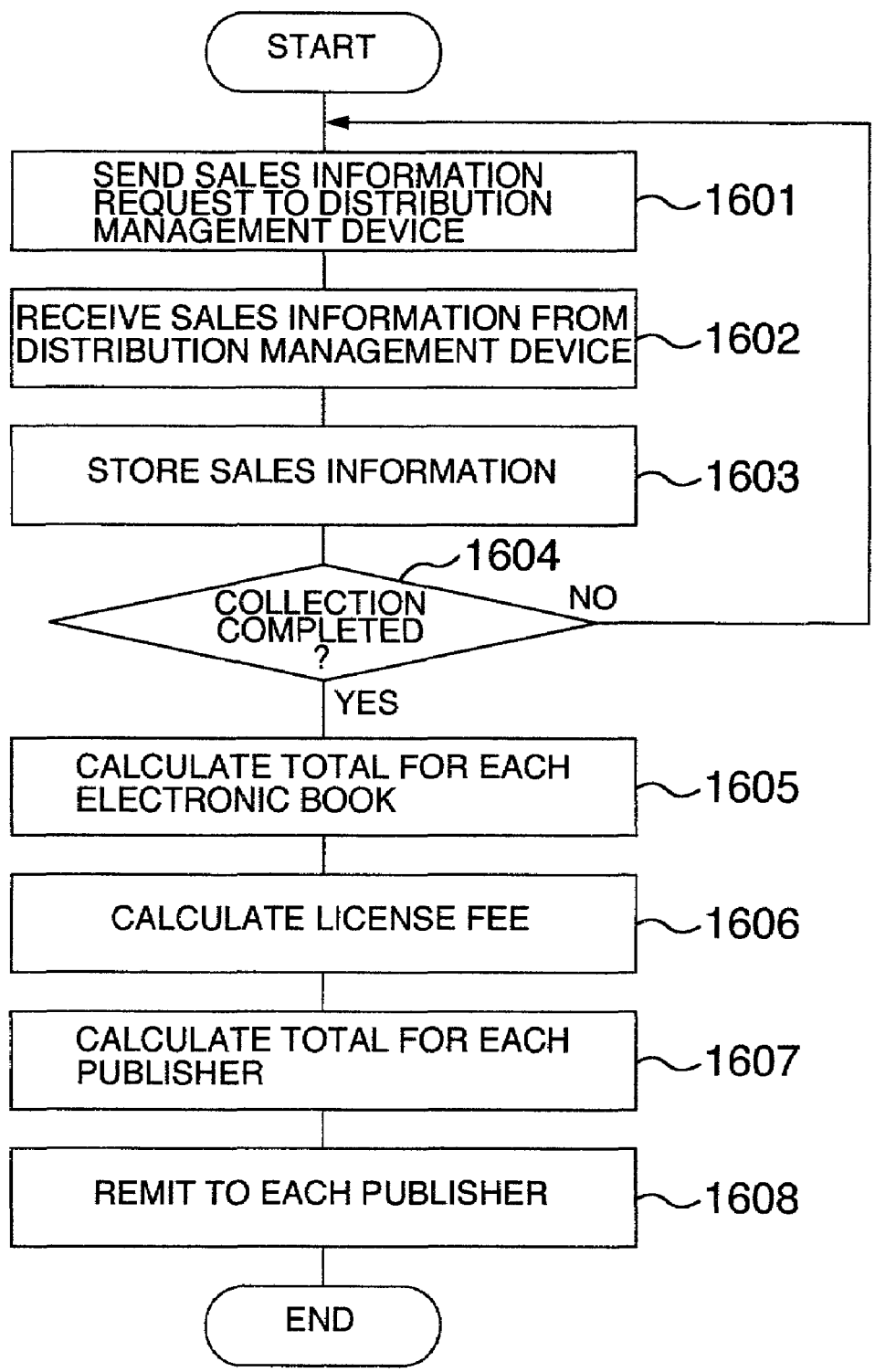
FIG. 16 is a flowchart showing a processing procedure of a license section of the embodiment.

FIG. 16 is a flowchart showing a processing procedure of license section 413 of the embodiment. In step 1601, section 413 of content database device 120 sends a transmission request of sales information collected by vending device 140 to distribution management device 130.

In step 1602, section 413 of database device 120 receives sales information sent from vending device 140 and relayed by distribution management device 130. In step 1603, section 413 stores the received sales information in magnetic disk device 403.

In step 1604, section 413 makes a check, for each distribution management device connected to content database device 120, to determine whether or not sales information from the distribution management device has been completely received. If the reception of sales information therefrom has not been yet completed, control returns to step 1601 to continue processing. If the reception of sales information therefrom has been completed, the pertinent processing is terminated.

In step 1605, section 413 reads from magnetic disk device the sales information received from the plural vending devices 140 to total the information for each electronic book. In step 1606, section 413 refers to copyright license management information in magnetic disk device 403 to calculate a license fee for each electronic device according to the sales information totaled.

In step 1607, section 413 totals for each publisher the license fee calculated for each electronic book. In step 140, section 413 transfers the totaled license fee to an account of the publisher from the license processing account to which the amount of sales is sent from the vending devices 140.

Figure 17:
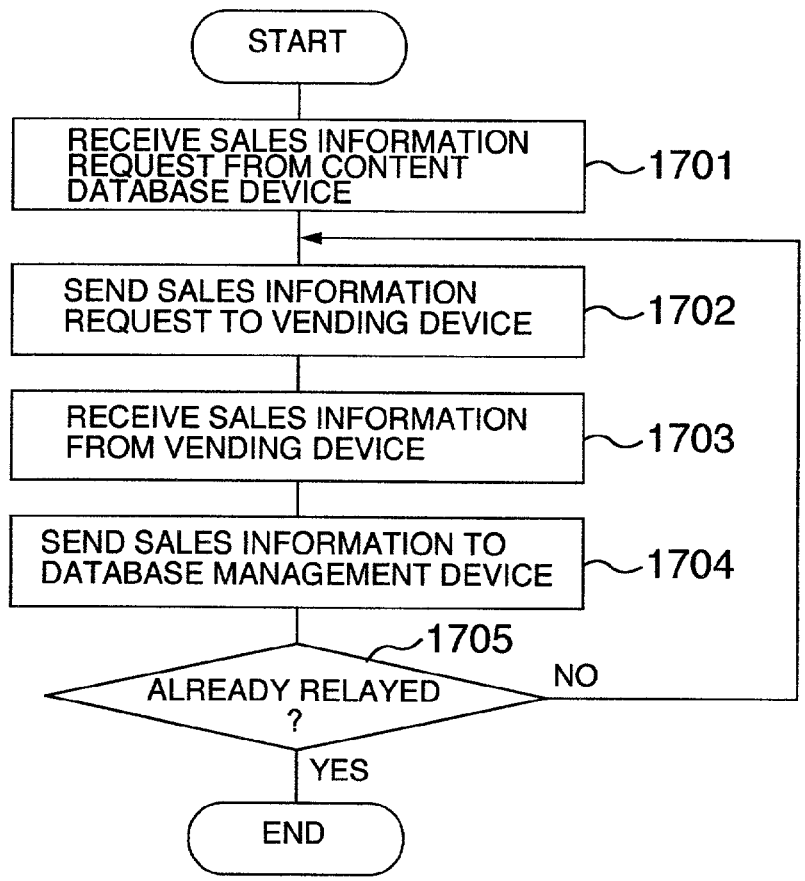
FIG. 17 is a flowchart showing a processing procedure of a sales information relay section of the embodiment.

FIG. 17 is a flowchart showing a processing procedure of sales information relay section 513 of the embodiment. In step 1701, section 513 of distribution management device 130 receives a sales information request sent from content database device 120. In step 1702, section 513 relays the received sales information request to vending device 140 while converting by protocol conversion section 510 a communication protocol between content database device 120 and vending device 140.

In step 1703, section 513 of distribution management device 130 receives sales information from vending device 140. In step 1704, section 513 relays the received sales information to content database device 120 while converting by protocol conversion section 510 the communication protocol between content database device 120 and vending device 140.

In step 1705, section 513 makes a check, for each vending device to which sales information is relayed by distribution management device 130, to determine whether or not the sales information has been completely relayed. If the information has not been completely relayed, control returns to step 1702 to continue processing. If the information has been completely relayed, the processing is terminated.

Figure 18:
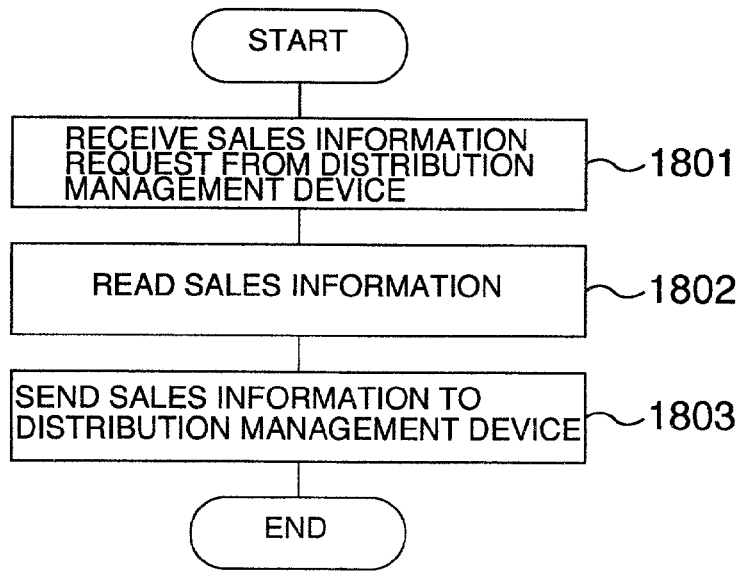
FIG. 18 is a flowchart showing a processing procedure of a sales information collecting section of the embodiment.

FIG. 18 is a flowchart showing a processing procedure of processing section for collecting sales information 614 of the embodiment. In step 1801, section 614 of vending device 140 receives a sales information request relayed via distribution management device 130. In step 1802, section 614 reads sales information from magnetic disk device 603 and totals the sales information for each electronic book. In step 1803, section 614 sends the totaled sales information to distribution management device 130.

Next, description will be given of another configuration example of the digital content distribution system of the embodiment.

Figure 19:
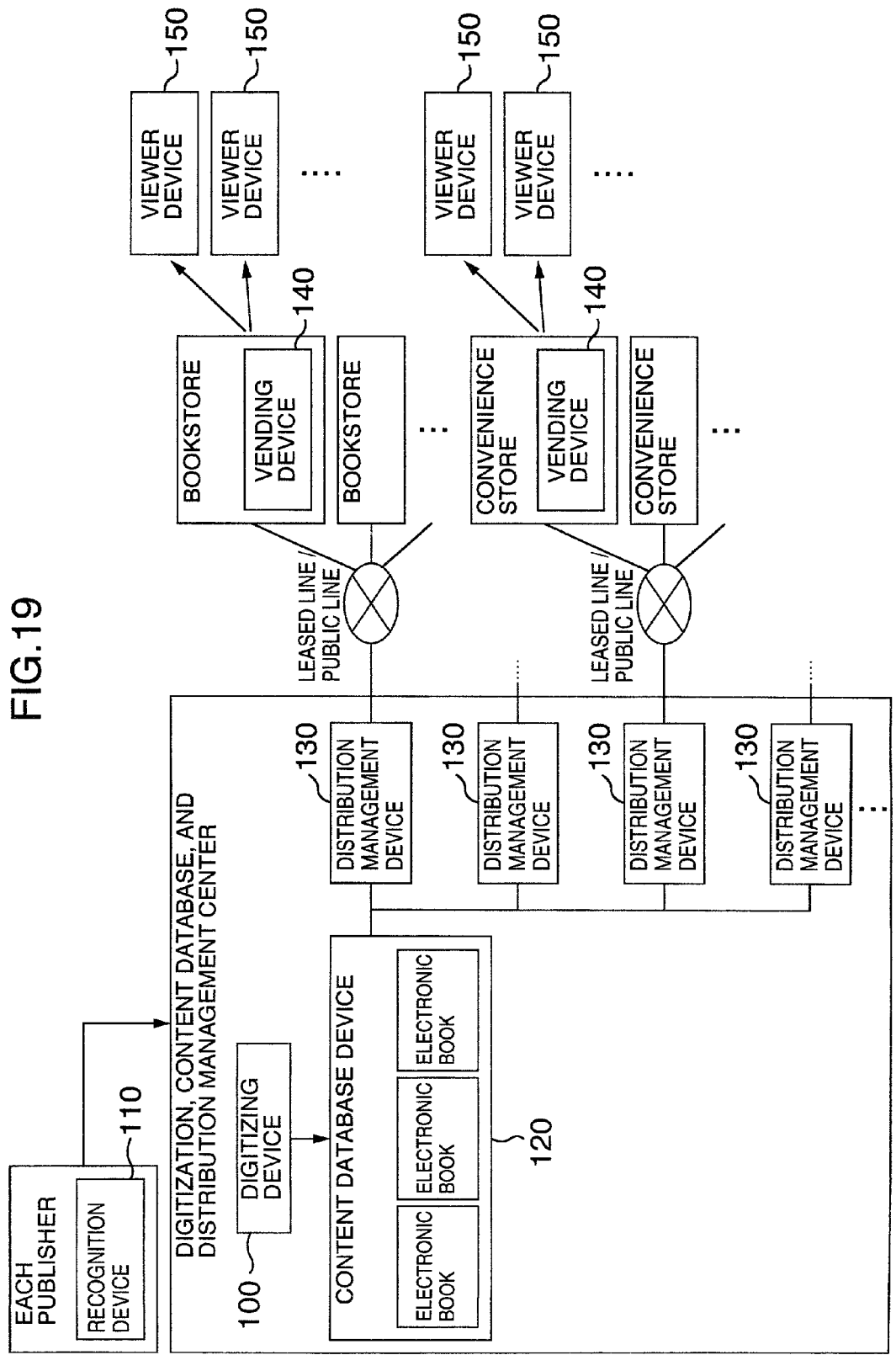
FIG. 19 is a diagram showing a second configuration example of the embodiment of the digital content distribution system in accordance with the present invention.

FIG. 19 shows a second configuration example of the digital content distribution system of the embodiment. In the system shown in FIG. 19, a digitalization center, a content database center, and a distribution management center are integrated into one center. In this situation, facilities necessary for the respective centers can be shared therebetween and the number of persons required for operation can be advantageously minimized.

Figure 20:
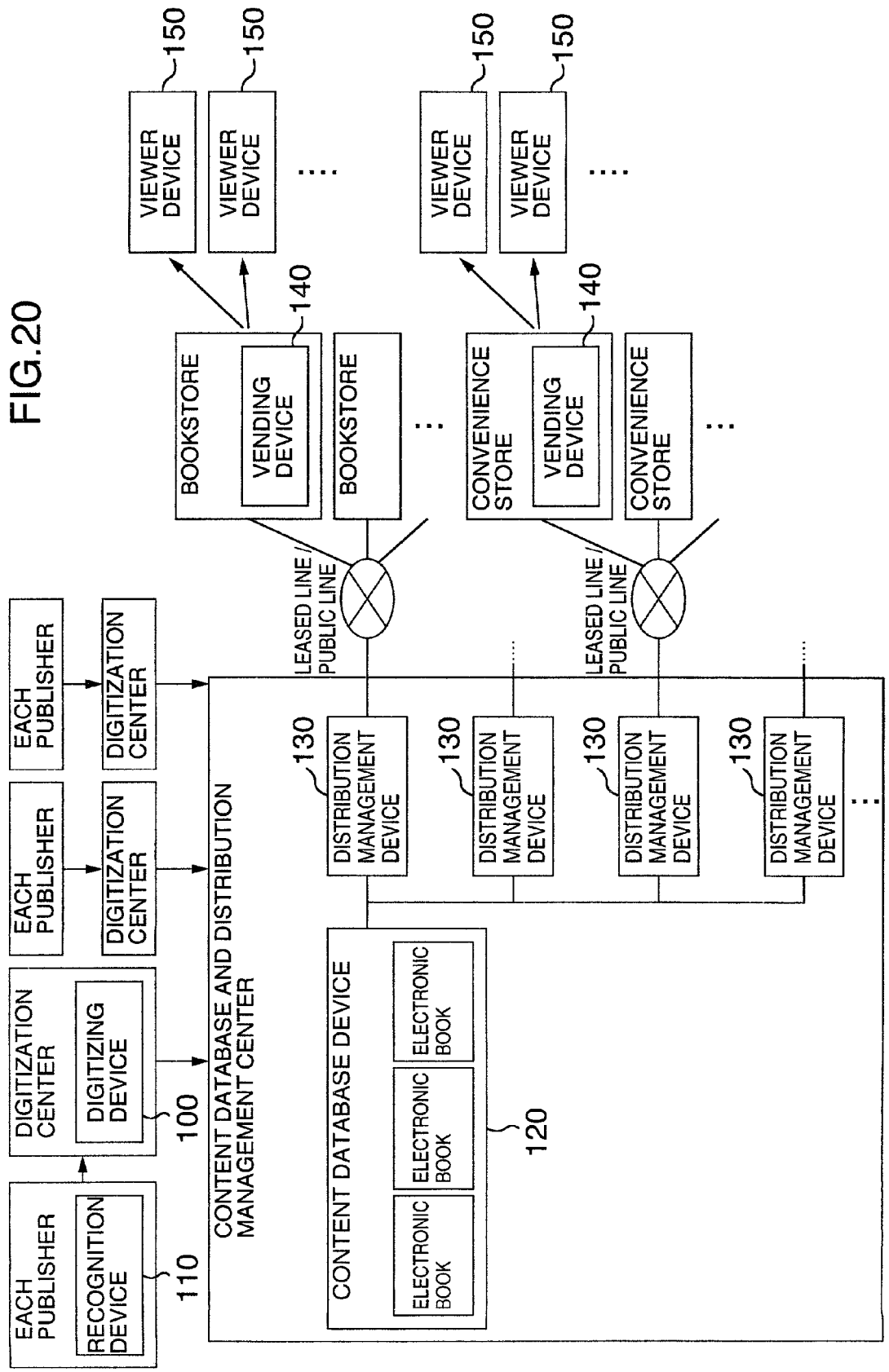
FIG. 20 is a diagram showing a third configuration example of the embodiment of the digital content distribution system in accordance with the present invention.

FIG. 20 shows a third configuration example of the digital content distribution system of the embodiment. In this, a digitization center is installed in the vicinity of a publisher, and a content database center and a distribution management center are integrated into one center. In the configuration, the digitization can be achieved in the proximity of the location of each publisher in which an original book of a content actually exists, which minimizes the distribution of the original books of the contents.

Figure 21:
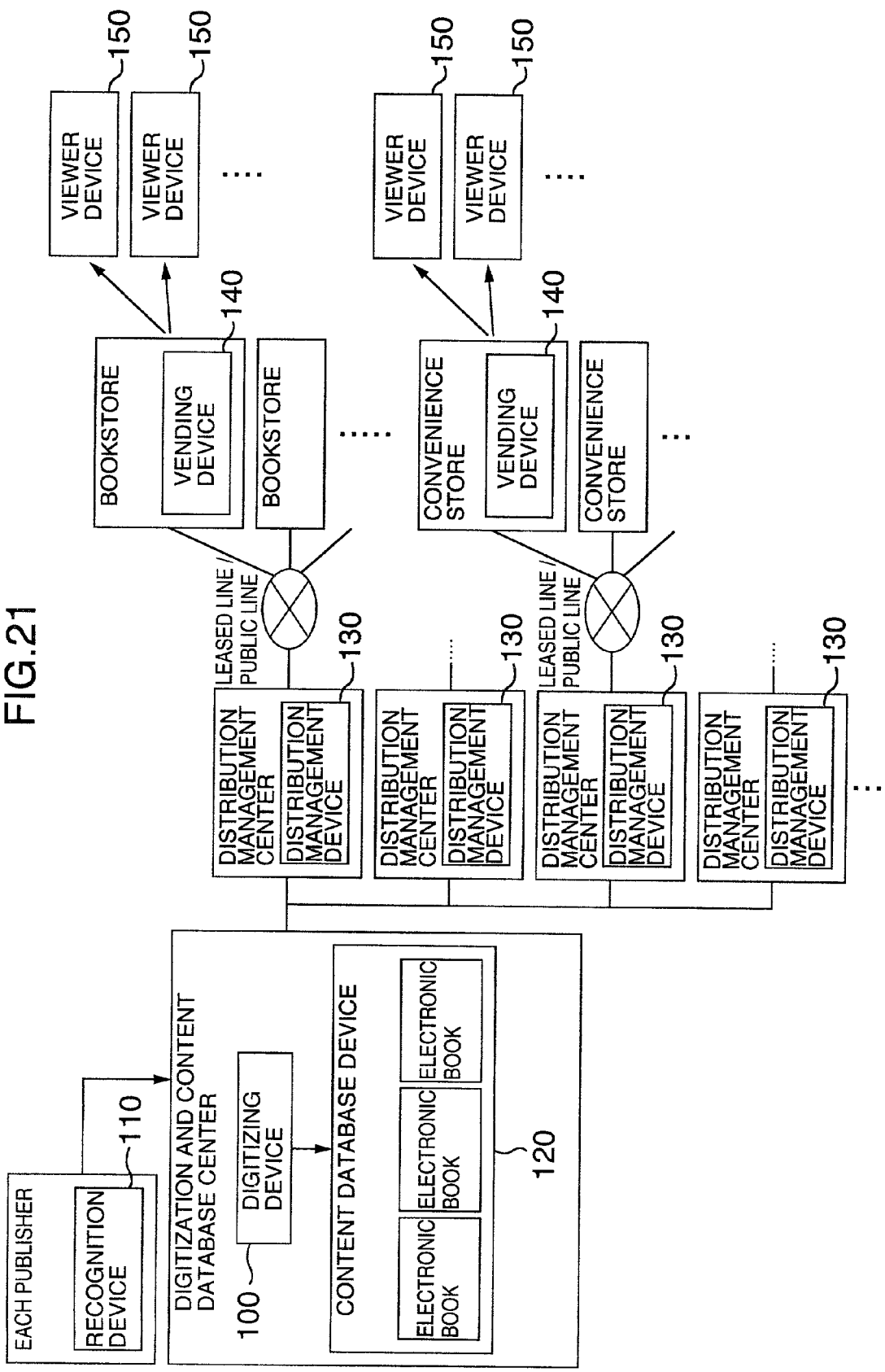
FIG. 21 is a diagram showing a fourth configuration example of the embodiment of the digital content distribution system in accordance with the present invention.

FIG. 21 shows a fourth configuration example of the digital content distribution system of the embodiment. In the system shown in FIG. 21, a digitalization center and a content database center are integrated into one center, which is connected to each distribution management center. In this situation, since each distribution center can be separately allocated to each distribution route, traffic on the network can be reduced in the communication of digital contents, information of goods, and the like and hence the processing load can be distributed. Furthermore, in each distribution center, it is possible to install facilities dedicated to its distribution.

As described above, in accordance with the embodiments of the digital content distribution system, the distribution of digital contents from the content database center to the stores is completely achieved via the network. Therefore, the digital contents can be distributed at a high speed.

In accordance with the embodiments of the digital content distribution system, when a digital content is sold, sales information thereof is collected to calculate a license fee for the digital content. Consequently, the license fee can be distributed to a content holder according to the number of digital contents sold.

In accordance with the present invention, since the distribution of digital contents from the content database center to the stores is completely achieved via the network, it is possible to distribute the digital contents at a high speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. A digital contents distribution method, comprising the steps of:
  (a) creating, by a content database device, a distribution schedule for transmitting digital contents and their goods information to each of the distribution management devices, with the digital contents being stored in the content database device;
  (b) transmitting, by the content database device, the digital contents, their goods information and the distribution schedule from the content database device to each of the distribution management devices connected by a network to the content database device;
  (c) storing, by each of the distribution management devices, the digital contents, their goods information and the distribution schedule in a storage of the particular distribution management device;
  (d) transmitting, by each of the distribution management devices, the digital contents and their goods information thus stored to each of vending devices connected with the network according to the received distribution schedule;
  (e) adding, by each of the vending devices, the digital contents and their goods information thus received to digital contents and their goods information already stored in a storage of the particular vending device;
  (f) if a capacity of the storage of the vending device is insufficient to store the digital contents and their goods information thus received, removing, by the vending device, a part of the digital contents already stored from the storage, based on predetermined criteria, and then storing the digital contents thus received;
  (g) presenting, by the customer, a desired digital content from among the goods information;
  (h) if the digital content selected by the customer is not stored in the storage, sending, by the vending device, a request for distribution of the digital content selected by the customer to the content database center;
  (i) receiving, by the content database center, the request sent from the vending device; and
  (j) in response to the request sent from the vending device performing steps (a) through (f).

2. A digital control distribution method according to claim 1, further comprising the steps of:
  (k) storing, by the distribution management device, the digital content received from the content database center in its own storage, the received digital content being the digital content selected by the customer;
  (l) transmitting, by the distribution management device, the digital content selected by the customer from the distribution management device to the vending device;
  (m) storing, by the vending device, the received digital content selected by the customer in its own storage;
  (n) selling, by the vending device, the digital content selected by the customer to the customer; and
  (o) recording, by the vending device, sales information as to sales of the digital content.

3. A digital contents distribution method for distributing digital contents in a digital contents distribution system including a content database center which stores digital contents, a plurality of distribution management centers connected with said content database center via a network, each of said distribution management centers having a storage device, and a plurality of vending devices each of which is connected with one of said distribution management centers via a network to sell digital contents stored in said content database center, wherein a three-layer structure is formed by said content database center, said distribution management centers and said vending devices via the network, said digital contents distribution method comprising the steps of:
  transmitting, by said content database center, digital contents to a vending device via a corresponding distribution management center connected with a particular vending device;
  saving, by said corresponding distribution management center, the digital contents storage device of said corresponding distribution management center, when the digital contents are transmitted from said content database center to said particular vending device;

selecting, by said particular vending device, a digital content desired by a user in response to user input, said particular vending device being installed at a corresponding store of a plurality of stores selling digital contents;

if said selected digital content is not saved in said corresponding store, generating, by said particular vending device, a request for distribution of said selected digital content, and sending said request to said corresponding distribution management center;

if said selected digital content is saved in the storage device of said corresponding distribution management center, sending, by said corresponding distribution management center, said selected digital content to said particular vending device;

if said selected digital content is not saved in the storage device of said corresponding distribution management center, sending, by said corresponding distribution management center, said request to said content database center, receiving said selected digital content from said content database center, saving said selected digital content in the storage device of said corresponding distribution management center, and then sending said selected digital content to said particular vending device; and selling, by said particular vending device at said corresponding store, said selected digital content to said user.

4. A digital contents distribution method according to claim 3, further comprising the steps of:

generating, by a digitizing device, connected with said content database center via network, a digital content by digitizing an original content and transmitting, from said digitizing device to an acknowledgement device, a request for confirmation of content of said digital content;

executing, by said acknowledgement device connected with said digitizing device via network, in response to said request, confirmation of said content of said digital content by determining whether said content of said digital content can be approved and transmitting, by said acknowledgement device, a message indicating whether said content of said digital content is acknowledged or not based on said determination; and receiving, by said digitizing device, said message, and accumulating said content of said digital content if said content of said digital content has been acknowledged.

5. A digital contents distribution system comprising:

a content database center which stores digital contents;

a plurality of distribution management centers connected with said content database center via a network, each of said distribution management centers having a storage device;

a plurality of vending devices each of which is connected with one of said distribution management centers via the network to sell digital contents stored in said content database center, wherein a three-layer structure is formed by said content database center, said distribution management centers and said vending devices via the network, wherein said content database center transmits digital contents to a particular vending device via a corresponding distribution management center connected with said particular vending device, wherein said corresponding distribution management center saves the digital contents in the storage device of said corresponding distribution management center, when the digital contents are transmitted from said content database center to said particular vending device, wherein said particular vending device selects a digital content desired by a user in response to user input, and said particular vending device is installed at a corresponding store of a plurality of stores selling digital contents, wherein if said selected digital content is not saved in said corresponding store, said particular vending device generates a request for distribution of said selected digital content, and sends said request to said corresponding distribution management center, wherein if said selected digital content is saved in the storage device of said corresponding distribution management center, said corresponding distribution management center sends said selected digital content to said particular vending device, wherein if said selected digital content is not saved in the storage device of said corresponding distribution management center, said corresponding distribution management center sends said request to said content database center, receives said selected digital content from said content database center, saves said selected digital content in the storage device of said corresponding distribution management center, and then sends said selected digital content to said particular vending device, and wherein said particular vending device at said corresponding store sells said selected digital content to said user.

6. A storage medium storing a program for distributing digital contents in a digital contents distribution system including a content database center which stores digital contents, a plurality of distribution management centers connected with said content database center via a network, each of said distribution management centers having a storage device, and a plurality of vending devices each of which is connected with one of said distribution management centers via the network to sell digital contents stored in said content database center, wherein a three-layer structure is formed by said content database center, said distribution management centers and said vending devices via the network, wherein said program when executed causes said digital contents distribution system to perform the steps of:

transmitting, by said content database center, digital contents to a particular vending device via a corresponding distribution management center connected with said particular vending device;

saving, by said corresponding distribution management center, the digital contents in the storage device of said corresponding distribution management center, when the digital contents are transmitted from said content database center to said particular vending device;

selecting, by said particular vending device, a digital content desired by a user in response to user input, said particular vending device being installed at a corresponding store of a plurality of stores selling digital contents;

if said selected digital content is not saved in said corresponding store, generating, by said particular vending device, a request for distribution of said selected digital content, and sending said request to said corresponding distribution management center;

if said selected digital content is saved in the storage device of said corresponding distribution management center, sending, by said corresponding distribution management center, said selected digital content to said particular vending device, if said selected digital content is not saved in the storage device of said corresponding distribution management center, sending, by said corresponding distribution management center, said request to said content database center, receiving said selected digital content from said content database center, saving said selected digital content in the storage device of said corresponding distribution management center, and then sending said selected digital content to said particular vending device; and selling, by said particular vending device at said corresponding store, said selected digital content to said user.

7. A program file storing a program for distributing digital contents in a digital contents distribution system including a content database center which stores digital contents, a plurality of distribution management centers connected with said content database center via a network, each of said distribution management centers having a storage device, and a plurality of vending devices each of which is connected with one of said distribution management centers via the network to sell digital contents stored in said content database center, wherein a three-layer structure is formed by said content database center, said distribution management centers and said vending devices via the network, wherein said program when executed causes said digital contents distribution system to perform the steps of:

transmitting, by said content database center, digital contents to a particular vending device via a corresponding distribution management center connected with said particular vending device;

saving, by said corresponding distribution management center, the digital contents in the storage device of said corresponding distribution management center, when the digital contents are transmitted from said content database center to said particular vending device;

selecting, by said particular vending device, a digital content desired by a user in response to user input, said particular vending device being installed at a corresponding store of a plurality of stores selling digital contents;

if said selected digital content is not saved in said corresponding store, generating, by said particular vending device, a request for distribution of said selected digital content, and sending said request to said corresponding distribution management center;

if said selected digital content is saved in the storage device of said corresponding distribution management center, sending, by said corresponding distribution management center, said selected digital content to said particular vending device, if said selected digital content is not saved in the storage device of said corresponding distribution management center, sending, by said corresponding distribution management center, said request to said content database center, receiving said selected digital content from said content database center, saving said selected digital content in the storage device of said corresponding distribution management center, and then sending said selected digital content to said particular vending device; and selling, by said particular vending device at said corresponding store, said selected digital content to said user.

* * * * *